US010797934B1

United States Patent
Akman et al.

(10) Patent No.: US 10,797,934 B1
(45) Date of Patent: Oct. 6, 2020

(54) OPEN CONTROL PLANE FUNCTION FOR WIRELESS NETWORKS

(71) Applicant: NETSIA, INC., Sunnyvale, CA (US)

(72) Inventors: Arda Akman, Istanbul (TR); Seyhan Civanlar, Istanbul (TR); Burcu Yargicoglu, Istanbul (TR)

(73) Assignee: NETSIA, INC., Santa Clara, CA (US)

(*) Notice: Subject to any disclaimer, the term of this patent is extended or adjusted under 35 U.S.C. 154(b) by 0 days.

(21) Appl. No.: 16/663,323

(22) Filed: Oct. 24, 2019

(51) Int. Cl.
*H04W 4/00* (2018.01)
*H04L 12/24* (2006.01)
*H04W 80/08* (2009.01)
*H04W 84/04* (2009.01)

(52) U.S. Cl.
CPC ......... *H04L 41/022* (2013.01); *H04W 80/085* (2013.01); *H04W 84/042* (2013.01)

(58) Field of Classification Search
CPC .. H04L 41/022; H04W 84/042; H04W 80/085
USPC .......................................... 455/422; 370/338
See application file for complete search history.

(56) References Cited

U.S. PATENT DOCUMENTS

2019/0191467 A1* 6/2019 Dao ...................... H04W 60/00

OTHER PUBLICATIONS

"3rd Generation Partnership Project; Technical Specification Group Radio Access Network; NR; Radio Resource Control (RRC) protocol specification (Release 15)," 3GPP TS 38.331, V15.4.0, Dec. 2018, 474pgs.
Stewart, "Stream Control Transmission Protocol," RFC 4960, Sep. 2007, 152pgs.
Universal Mobile Telecommunications System (UMTS); LTE; Non-Access-Stratum (NAS) protocol for Evolved Packet System (EPS); Stage 3, 3GPP TS 24.301, V8.10.0, Rel 8, Jun. 2011, 264pgs.

* cited by examiner

*Primary Examiner* — Marcos Batista
(74) *Attorney, Agent, or Firm* — IP Authority, LLC; Ramraj Soundararajan

(57) ABSTRACT

3GPP's 5th generation mobile network (5G) standards provide a service-based architecture by widely distributing control functions as virtualized network functions (VNFs). However, the equipment and software vendors control these control plane functions in a closed-box manner. This invention provides a new control plane function called Open Control Plane Function (OCPF), which allows various control applications of operators or third parties to register to certain control functions so that they can receive and process signaling/control messages outside those control functions. With this invention, new applications can be developed to view and modify control plane behavior utilizing both traditional methods as well as upcoming Machine Learning and Artificial Intelligence algorithms to provide new and innovative services that are not part of standard operator offerings.

22 Claims, 10 Drawing Sheets

OPEN CONTROL PLANE FUNCTION FOR WIRELESS NETWORKS

BACKGROUND OF THE INVENTION

Field of Invention

The present invention relates to a system and method for providing an open control plane network of a cellular operator that provides interfaces from control plane services to operator and third party applications so that they can copy, intercept or intervene signaling/control messages.

Discussion of Related Art

Any discussion of the prior art throughout the specification should in no way be considered as an admission that such prior art is widely known or forms part of common general knowledge in the field.

The 3G standards tightly couples control and data plane functions in Serving GPRS Support Node (SGSN) and Gateway GPRS Support Node (GGSN). In contrast, the mobility management functionality of the SGSN is separated out into the Mobility Management Entity (MME) that formed the control plane in 4G, while the data plane functionality of the SGSN is separated into yet another component called the Serving Gateway (SGW). This separation allows scaling of the control plane aspects in the MME independently of the data forwarding aspects in the SGW and Packet Gateway (PGW). The collection of SGW, PGW and MME form the so-called Enhanced Core Network (EPC).

Furthermore, the SGW and PGW are divided into control plane and user plane (synonymous with data plane) functions, aka SGW-C and SGW-U, allowing the centralization of the control of the SGW and PGW, where a single SGW-C or PGW-C can now control many SGW-Us or PGW-Us, respectively. The S1-C (control plane) interface in 4G is used between base station (eNodeB) and EPC. The S1-C consists of Stream Control Transmission Protocol (SCTP) over IP (see RFC 4960: "Stream Control Transmission Protocol") and supports multiple UEs through a single SCTP association. It also provides guaranteed data delivery. The S1-C is responsible for bearer setup/release procedures, the handover signaling, the paging and the Non-Access Stratum (NAS) transport procedures.

The 5G standards went further in control and user plane separation by providing an even more granular division of control plane functions. The Access and Mobility Management Function (AMF), for example, provides services analogous to mobility management functions of the MME. However, the session management functions of the MME are separated out and combined with SGW-C and PGW-C functions to create the so called Session Management Function (SMF). Thus, the AMF, unlike the MME, does not include session management. For example, the session management control messages from the UE are terminated by the SMF, whereas in 4G, these would have been terminated by the MME. One advantage of the mobility management and session management separation is that AMF can now be adapted for non-3GPP access networks as well. In 5G, the protocol for interaction between all control-plane entities is HTTP, which is a protocol widely used in the Internet. A service-based architecture is employed at the control plane, where components can query the Network Repository Function (NRF) to discover and communicate with each other over simple APIs.

A User Equipment (UE) has two main types of control plane connections with the mobile network: (1) a Radio Resource Control (RRC) connection to the base station (see reference 3GPP TS 38.331, V15.4.0, Radio Resource Control Protocol), and (2) a Non-access Stratum (NAS) (see reference 3GPP TS 24.301, Rel. 8, NAS for Evolved Packet System (EPS)) connection. The NAS connection is between the UE and MME in 4G, and between the UE and AMF in 5G. The NAS protocol is used for network attachment, authentication, setting up bearers, and mobility management. The RRC makes handover decisions based on neighbor cell measurements reported by the UE, performs paging of users over the air-interface, broadcasts system information, controls UE measurement and reporting functions such as the periodicity of channel quality indicator reports, and further allocates cell-level temporary identifiers to active users. It also executes transfer of UE context from the serving base station to the target base station during handover, and performs integrity protection of RRC messages. The RRC layer is responsible for setting up and maintenance of radio bearers. Note that the RRC sub-layer in 3GPP protocol hierarchy is considered as layer 3.

One of the primary technical challenges facing service providers today is the ability to deliver a wide array of network performance characteristics that future services will demand. To name a few, bandwidth, latency, packet loss, security, and reliability will greatly vary from one service to the other. Emerging applications such as remote operation of robots, massive TOT, and self-driving cars require connectivity, but with vastly different characteristics. The combination of architecture flexibility, software programmability, and needs of different business segments (medical, factories, military, public safety, etc.) and applications have led to the creation of the concept of network slicing. A network slice provides a way to completely segment the mobile network to support a particular type of service or business or even to host service providers (multi-tenancy) who do not own a physical network. Furthermore, each slice can be optimized according to capacity, coverage, connectivity, security and performance characteristics. Since the slices can be isolated from each other, as if they are physically separated both in the control and user planes, the user experience of the network slice will be the same as if it was a separate network. A network slice can span all domains of the network including software applications (both memory and processing) running on network nodes, specific configurations of the core transport network, access network configurations as well as the end devices. The network slicing enables multiple operators to share a mobile network securely but by separating their own users from others, and different applications of a user to use different network slices that provide widely different performance characteristics.

The separation of control plane from the user plane, virtualization of network control functions into more granular sub-functions, along with the slicing of the mobile network's user plane and providing these slices to other organizational entities (service or application providers) create a requirement of giving more control over these slices to those slice-owning entities. In prior art, the control plane is a completely closed (proprietary) network that is under the control of the equipment vendors of the mobile network operator. Because of that, although a slice of user plane of the mobile network can be provided to an entity other than the operator, the control plane aspects are not provided. A new model is needed to provide the ability to open up the control plane functions and let the network operator, users of network slices, 3rd party application developers and other stakeholders provide new and innovative mobile services.

In the first embodiment, the Open Control Plane Function (OCPF) provides a first interface for the registration of a plurality of control functions of the mobile network, during the so-called control plane (CP) registration phase, that can open up their signaling messages to applications. After completing the registration, these control functions are called 'registered' control functions. Note that some control functions may not yet (or will not) have capabilities to open up signaling messages. Thus, it is critical that OCPF knows which entities of the control plane can serve an open control function through this initial CP registration phase.

In the second embodiment, a so-called Open Control Plane Function (OCPF) is employed in the control plane that provides a first interface for the registration of a plurality of applications that request to receive and to process signaling/control messages of control plane functions of their selection, such as the base station, MME, AMF, etc. Doing so, various types of applications can securely attach, get authorized and authenticated, and register to selected control function (e.g., have visibility to or control over certain signaling messages that govern groups of users). The first leg of the complete application registry phase is connecting the application to OCPF, which is achieved through this interface.

In the third embodiment, the Open Control Plane Function (OCPF) uses said first interface towards a 'registered' control function that is selected by an application so that it can relay the registration service request of that application to the control function. This phase is the second and final leg of the application registry phase. Application registration phase is deemed complete once this step is successfully completed.

In the fourth embodiment, the Open Control Plane Function (OCPF) uses said first and second interfaces to receive and transmit signaling messages between the registered applications and registered control functions.

In the fifth embodiment, the Open Control Plane Function (OCPF) provides a control message processor function that associates each incoming and outgoing signaling message pair (between a control function and application), that belongs to the same messaging sequence/dialog.

In the sixth embodiment, the Open Control Plane Function (OCPF) provides an 'action registry' that has the set of rules that applies to OCPF's actions (receiving, forwarding, discarding, associating) on each incoming and outgoing signaling message pair between a control function and an application.

There are two key modifications in the base station and each of the key network control functions such as MMES in 4G, or AMF, and SMF in 5G to enable the above embodiments of OCPF:

(a) A new Open Control Interface (OCI) module that directly registers with OCPF using said first interface. All control plane messages are forwarded to OCPF using OCI;

(b) New capabilities within the control function to interact with OCI for control message handling. Such handling includes, but not limited to, receiving messages from OCI, sending messages to OCI, and suspending or resuming normal control message sequencing while messages are being transferred to an application for processing.

The application may request one or more of the following exemplary services from a control function via OCPF:

Duplicate service: With this service, the application receives a copy of a specific control protocol procedure and/or message sequence. Example protocols would be RRC, S1-C and X2. Example procedures would be Initial Context Setup and Bearer Modification. A probe application may use the Duplicate service to capture statistics about the network's or a network slice's Key Performance Indicators (KPI). The application registers with OCPF with an exemplary registration message such as RegDuplicate(*) wherein the registration message has information elements in (*) such as The control plane function identifier, Specific protocol type (e.g., RRC, S1, X2, etc.) and a specific procedure or message sequence (e.g., Initial Context Setup or Handover), Specific user group identifier for which data is requested e.g., UE1, UE2, UE(nssi=5), users of slice xyz, The time interval of the measurement cycle, and An identifier of the requesting application (e.g., application's authentication and authorization information).

The application does not interfere with the normal control procedure or messaging sequence of the control function in the duplicate service. Thus, one can view this service as 'read-only'.

Intercept function: With this service, the application receives a certain subset of a specific control protocol procedure and/or message sequence, and handles the overall control procedure, replying back to the control procedure with the next step to be executed (e.g., next message to be transmitted out) meanwhile, the control function suspending the control messaging until instructed to resume by the application via OCPF. Example protocols would be RRC, S1 and X2. Example procedures would be Initial Context Setup and Bearer Modification. A slice admission control application may use the Intercept service to control the admission of certain group of users within the slice. The application registers with the OCPF using an exemplary registration message such as RegIntercept (*) wherein the registration message has information elements such as The control plane function identifier, Specific protocol type (e.g., RRC, S1, X2, etc.) and a specific procedure or message sequence (e.g., Initial Context Setup or Handover), Specific user group identifier for which data is requested e.g., UE1, UE2, UE(nssi=5), users of slice xyz, The time interval of the measurement cycle, and An identifier of the requesting application (e.g., application's authentication and authorization information).

The specific message within the control message sequence of the specific protocol that will be replied back by the application.

Note that the control function must suspend control messaging until said specific message is received and replied by the application, and then resume control message sequencing when the reply is received.

Intervene function: With this service, the application receives a specific type control protocol procedure and/or message sequence and it can change information elements within a control message. Example protocols would be RRC, S1 and X2. Example procedures would be Initial Context Setup or Bearer Modification. A slice QoS control application may use the Intervene service to control the QoS of certain users within the slice. The application registers with the OCPF using an exemplary registration message such as RegIntervene(*) wherein the registration message has information elements such as The control plane function identifier,
Specific protocol type (e.g., RRC, S1, X2, etc.) and a specific procedure or message sequence (e.g., Initial Context Setup or Handover),
Specific user group identifier for which data is requested e.g., UE1, UE2, UE(nssi=5), users of slice xyz,
The time interval of the measurement cycle, and
An identifier of the requesting application (e.g., application's authentication and authorization information).
The specific message within the message sequence of the specific protocol that will be received, modified and looped-back by the application. The received message is called the original message, and the original message that is modified by the application is called the modified message.

Note that the control function must suspend the control messaging after sending the original message to the application, and resume control message sequencing after it receives the modified message.

Above are simply example services to clarify the use of OCPF. Other types of services, registration protocols, and other similar registration syntaxes and semantics are possible and assumed to be covered by this application. Although the registration interface between OCPF and applications, or between OCPF and control functions could be a published open API defined by standards, in another embodiment this interface can be proprietary.

Embodiments of the present invention are an improvement over prior art systems and methods.

SUMMARY OF THE INVENTION

In one embodiment, the present invention provides a method of sending one or more signaling messages generated in a mobile network, the mobile network comprising a separate control plane and user plane, the control plane comprising at least one control function, the at least one control function generating the one or more signaling messages, the one or more signaling messages transmitted to an application, the application external to the control plane and operated by a mobile operator or a third-party service provider, the method, as implemented in an Open Control Plane Function (OCPF) comprising the steps of: (a) receiving a first registration message from the at least one control function and, upon receipt of the first registration message, registering the one control function in the OCPF; (b) receiving a second registration message from the application and, upon receipt of the second registration message, registering the application in the OCPF, the registering allowing the application to receive the one or more signaling messages from the at least one control function, the one or more signaling messages pertaining to a group of users of the mobile network; (c) receiving the one or more signaling messages pertaining to the group of users from the at least one control function, the one or more signaling messages received at the at least one control function from the group of users prior to being relayed to the OCPF; and (e) relaying the one or more signaling messages to the application.

In another embodiment, the present invention provides a method of sending one or more signaling messages generated in a mobile network, the mobile network comprising a separate control plane and user plane, the control plane comprising at least one control function, the at least one control function generating the one or more signaling messages, the one or more signaling messages transmitted to an application, the application external to the control plane and operated by a mobile operator or a third-party service provider, the method, as implemented in an Open Control Plane Function (OCPF) comprising the steps of: (a) receiving a first registration message from the at least one control function and, upon receipt of the first registration message, registering the one control function in the OCPF; (b) receiving a second registration message from the application and, upon receipt of the second registration message, registering the application in the OCPF, the registering allowing the application to receive and/or modify the one or more signaling messages originating from the at least one control function, the one or more signaling messages pertaining to a group of users of the mobile network; (c) receiving from the control function a given signaling message and, upon receiving the given signaling message, control function suspending normal signaling message process for the group of users; (d) relaying the given signaling message to the application, wherein the application either generates a new signaling message or modifies the given signaling message to form a modified signaling message in response to the received given signaling message; (e) receiving the new signaling message or the modified signaling message from the application; (f) relaying the new signaling message or the modified signaling message to the control function; and wherein the control function receives the new signaling message or the modified signaling message and resumes normal signaling message process with the received new signaling message or the modified signaling message for the group of users.

In another embodiment, the present invention provides a control function of the control plane of the mobile operator, the control function comprising: (a) a first registration interface to register a plurality of external applications; (b) a first database storing information on the plurality of external applications; (c) a second registration interface to register a plurality of control functions; (d) a second database storing information on the plurality of control functions; (e) a subfunction receiving a service request of the external application for handling certain signaling messages of each of the plurality of control functions; (f) a third database storing the service request of each the external application for each message type; (g) a first control messaging interface to communicate with the plurality of external applications; (h) a second control messaging interface to communicate with the plurality of control functions; and (i) a control message processor to manage the state of each signaling message that is in the processing by said external application.

In yet another embodiment, the present invention provides an article of manufacture comprising non-transitory computer storage medium storing computer readable program code which, when executed by a processor implements a method as implemented in an Open Control Plane Function (OCPF) of sending one or more signaling messages generated in a mobile network, the mobile network comprising a separate control plane and user plane, the control plane comprising at least one control function, the at least one control function generating the one or more signaling messages, the one or more signaling messages transmitted to an application, the application external to the control plane and operated by a mobile operator or a third-party service provider, the medium comprising: (a) computer readable program code receiving a first registration message from the at least one control function and, upon receipt of the first registration message, registering the one control function in the OCPF; (b) computer readable program code receiving a second registration message from the application and, upon receipt of the second registration message, registering the application in the OCPF, the registering allowing the application to receive the one or more signaling messages from the at least one control function, the one or more signaling messages pertaining to a group of users of the mobile network; (c) computer readable program code receiving the one or more signaling messages pertaining to the group of users from the at least one control function, the one or more signaling messages received at the at least one control function from the group of users prior to being relayed to the OCPF; and (e) computer readable program code relaying the one or more signaling messages to the application.

In another embodiment, the present invention provides an article of manufacture comprising non-transitory computer storage medium storing computer readable program code which, when executed by a processor implements a method as implemented in an Open Control Plane Function (OCPF) of sending one or more signaling messages generated in a mobile network, the mobile network comprising a separate control plane and user plane, the control plane comprising at least one control function, the at least one control function generating the one or more signaling messages, the one or more signaling messages transmitted to an application, the application external to the control plane and operated by a mobile operator or a third-party service provider, the medium comprising: (a) computer readable program code receiving a first registration message from the at least one control function and, upon receipt of the first registration message, registering the one control function in the OCPF; (b) computer readable program code receiving a second registration message from the application and, upon receipt of the second registration message, registering the application in the OCPF, the registering allowing the application to receive and/or modify the one or more signaling messages originating from the at least one control function, the one or more signaling messages pertaining to a group of users of the mobile network; (c) computer readable program code receiving from the control function a given signaling message and, upon receiving the given signaling message, suspending normal signaling message process for the group of users; (d) computer readable program code relaying the given signaling message to the application, wherein the application either generates a new signaling message or modifies the given signaling message to form a modified signaling message in response to the received given signaling message; (e) computer readable program code receiving the new signaling message or the modified signaling message from the application; (f) computer readable program code relaying the new signaling message or the modified signaling message to the control function; and wherein the control function receives the new signaling message or the modified signaling message and resumes normal signaling message process with the received new signaling message or the modified signaling message for the group of users.

BRIEF DESCRIPTION OF THE DRAWINGS

The present disclosure, in accordance with one or more various examples, is described in detail with reference to the following figures. The drawings are provided for purposes of illustration only and merely depict examples of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

DESCRIPTION OF THE PREFERRED EMBODIMENTS

Figure 1:
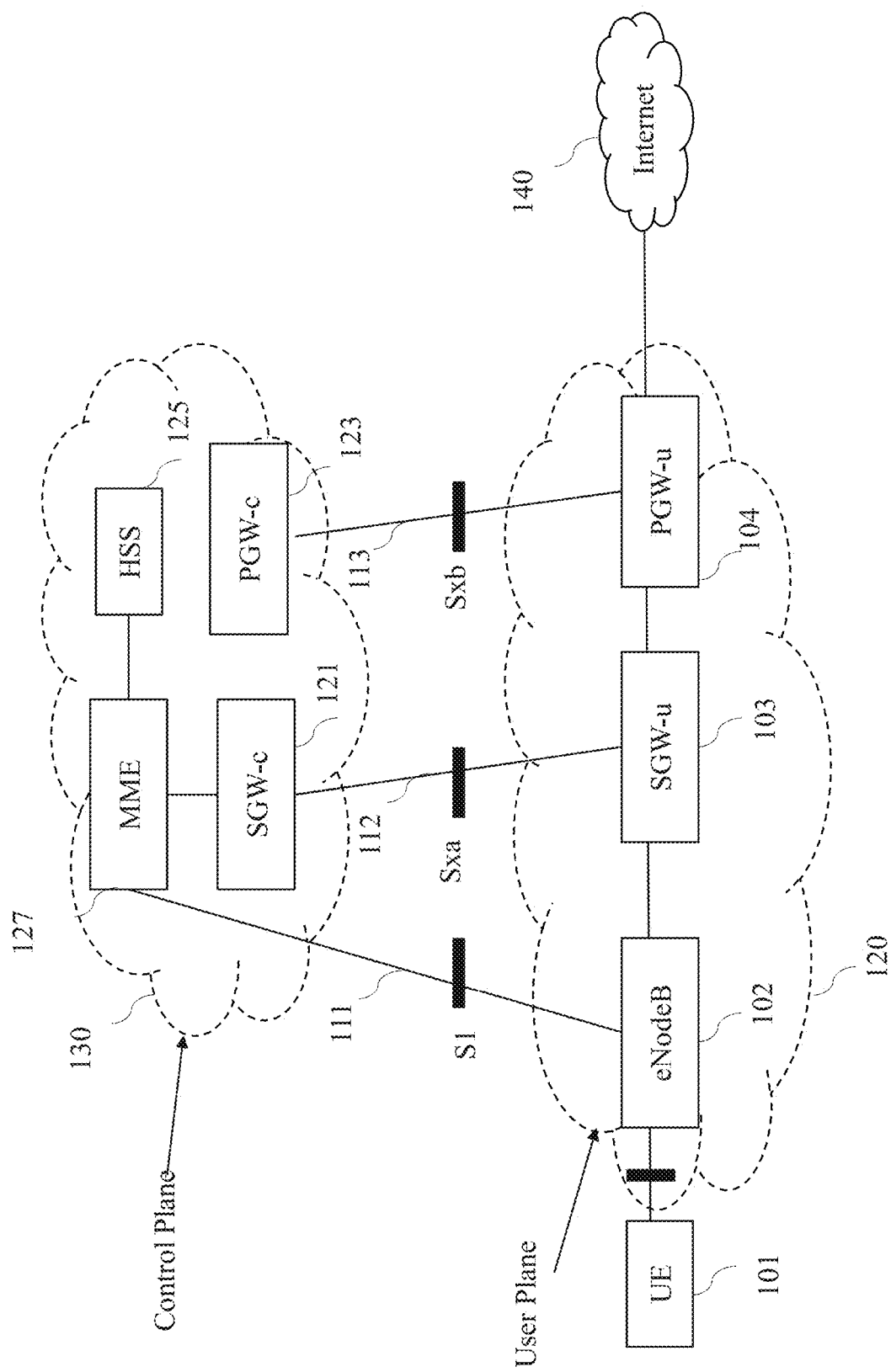
FIG. 1 illustrates an exemplary 4G user plane and control plane (prior art).

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein.

An electronic device (e.g., a base station, router, switch, gateway, base station, AMF, MME, SMF, OCPF, etc.) stores and transmits (internally and/or with other electronic devices over a network) code (composed of software instructions) and data using machine-readable media, such as non-transitory machine-readable media (e.g., machine-readable storage media such as magnetic disks; optical disks; read only memory; flash memory devices; phase change memory) and transitory machine-readable transmission media (e.g., electrical, optical, acoustical or other form of propagated signals—such as carrier waves, infrared signals). In addition, such electronic devices include hardware, such as a set of one or more processors coupled to one or more other components—e.g., one or more non-transitory machine-readable storage media (to store code and/or data) and network connections (to transmit code and/or data using propagating signals), as well as user input/output devices (e.g., a keyboard, a touchscreen, and/or a display) in some cases. The coupling of the set of processors and other components is typically through one or more interconnects within the electronic devices (e.g., busses and possibly bridges). Thus, a non-transitory machine-readable medium of a given electronic device typically stores instructions for execution on one or more processors of that electronic device. One or more parts of an embodiment of the invention may be implemented using different combinations of software, firmware, and/or hardware.

As used herein, a network device such as a base station, switch, router, controller, gateway or host is a piece of networking component, including hardware and software that communicatively interconnects with other equipment of the network (e.g., other network devices, and end systems). Switches provide network connectivity to other networking equipment such as switches, gateways, and routers that exhibit multiple layer networking functions (e.g., routing, layer-3 switching, bridging, VLAN (virtual LAN) switching, layer-2 switching, Quality of Service, and/or subscriber management), and/or provide support for traffic coming from multiple application services (e.g., data, voice, and video). User Equipment (UE) is generally a user device such as a cellular phone, or a sensor, or a computer or another type of equipment that wirelessly and with-wire connects to a network. Any physical device in the network such as a switch or VNF has a type, location, ID/name, Medium Access Control (MAC) address, and Internet Protocol (IP) address. A Virtual Network Function (VNF) runs on a physical device that is a standard server platform attached to a switch or as a component of a switch. A physical device can host a collection of VNFs, each identified by a virtual port number and/or virtual IP address.

Note that while the illustrated examples in the specification discuss mainly 5G networks relying on NFV (defined by European Telecommunications Standards Institute (ETSI)), embodiments of the invention may also be applicable to other kinds of networks (mobile and non-mobile) that have similar separated and closed control plane network.

FIG. 1 shows a simple prior art 4G/LTE network with control plane 130 and user plane 120 wherein user plane 120 is attached to Internet 140. User Equipment (UE) 101 is a mobile terminal that communicates with other mobile terminals or applications on Internet 140 using mobile operator's network. User plane 120 comprises base station (eNodeB) 102 that interfaces with UE 101 via a radio interface, and connects to Enhanced Core Network (EPC), which comprises a plurality of Serving GW(s)/SGW 103 and Packet GW(s)/PGW 104. Here, PGW 104 is attached directly to Internet 140. The control network comprises (a) SGW control function, SGW-C 121, which attaches to a plurality of SGW(s) 103 via interface 112 (known as Sxa interface), (b) PGW control function, PGW-C 123, which attaches to a plurality of PGW(s) 104 via interface 113 (known as Sxb interface), (c) Mobility Management Entity (MME) 127, and Home Subscriber Server (HSS) 125. MME 127 attaches to eNodeB 102 via control interface 111 (known as S1 control plane (S1-CP)). MME 127 performs (a) bearer activation/deactivation, (b) selection of appropriate SGW and PGW for the UE to connect to the Internet, (c) the role of termination point for Non-Access Stratum (NAS) signaling of each UE, and (d) communications with HSS 125 for user identification, authentication and location services.

Figure 2:
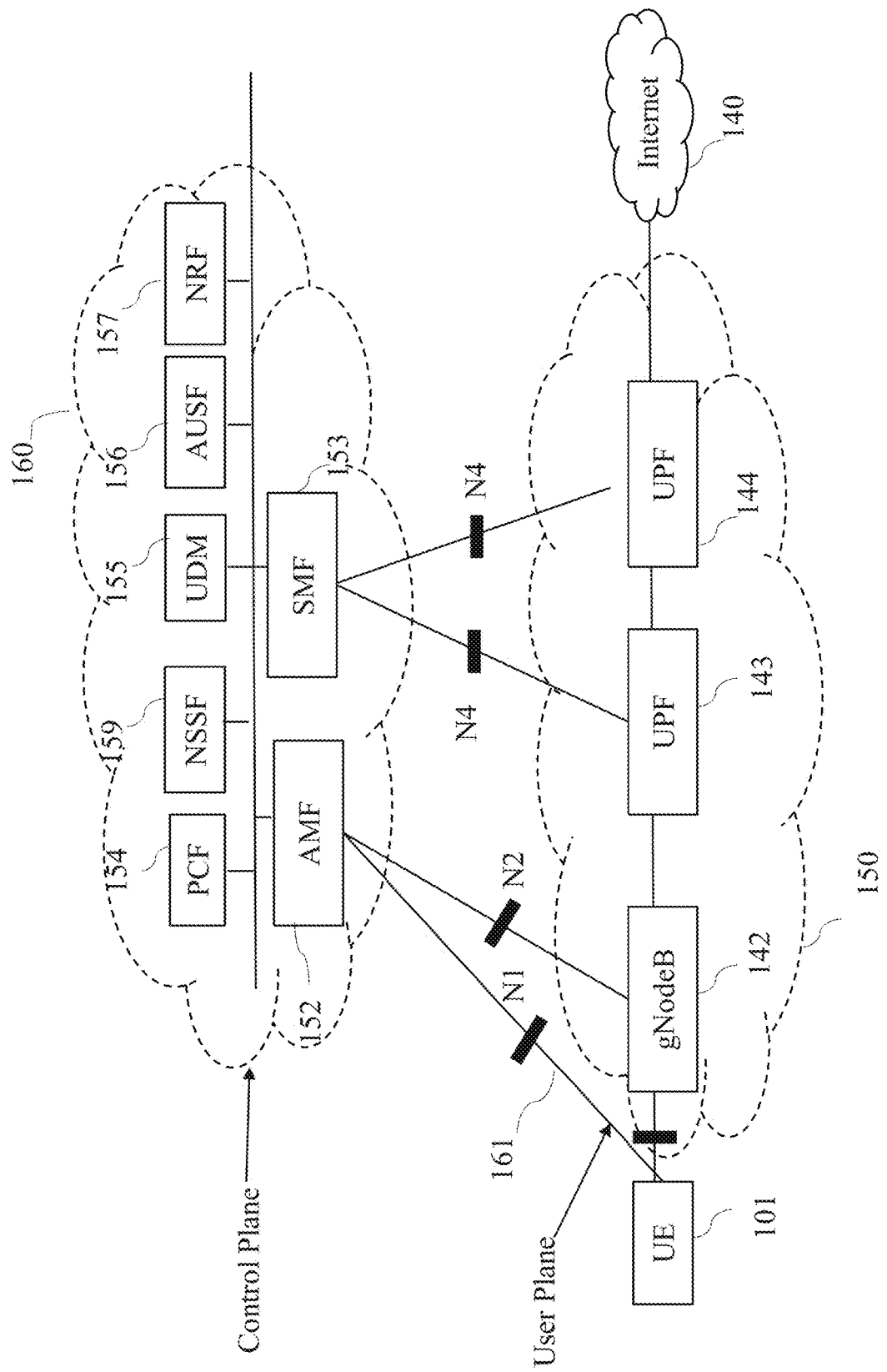
FIG. 2 illustrates an exemplary 5G user plane and control plane (prior art).

FIG. 2 illustrates a simple prior art 5G network with control plane 160 and user plane 150, wherein user plane 150 is attached to Internet 140. The control and user planes are modeled in 5G using a service oriented architecture (SOA), which is a type of software design where services of each component are provided to the services of all other components through a communication protocol over a network. A service is defined as a discrete functionality that can be accessed remotely and acted upon and updated independently. Each control plane function is modeled as a granular service component and replicated in the network. The SGW and PGW functions of the user plane of 4G are merged as a User Plane Function (UPF) in 5G.

User equipment (UE) 101 is a mobile terminal that communicates with other mobile terminals or applications on Internet 140 using mobile operator's network. User plane 150 comprises base station (gNodeB) 142 that interfaces with UE 101 via a radio interface, and connects to Packet Core (PC) Network, which comprises a plurality of User Plane Functions (UPFs) shown as UPF 143 and UPF 144 (that is attached directly to Internet 140). Control network 160 comprises various control functions granularly decomposed such as AMF (access mobility management function) 152, SMF (session management function) 153, PCF (policy control function) 154, UDM (user data management) 155, NRF (network repository function) 157 and AUSF (authentication server function) 156, NSSF (network slice selection function) 159, etc. AMF 152 and SMF 153 jointly provide all the functionalities of MME 127. AMF 152 attaches to UE 101 via control interface 161 (N1 interface). It also attaches to a plurality of gNodeB(s) via N2 interface. SMF 153 interfaces to a plurality of UPFs using N4 interface. The role or each control plane function and the control interface messages are clearly defined in 5G specifications and for that reason will not be recited here.

Figure 3:
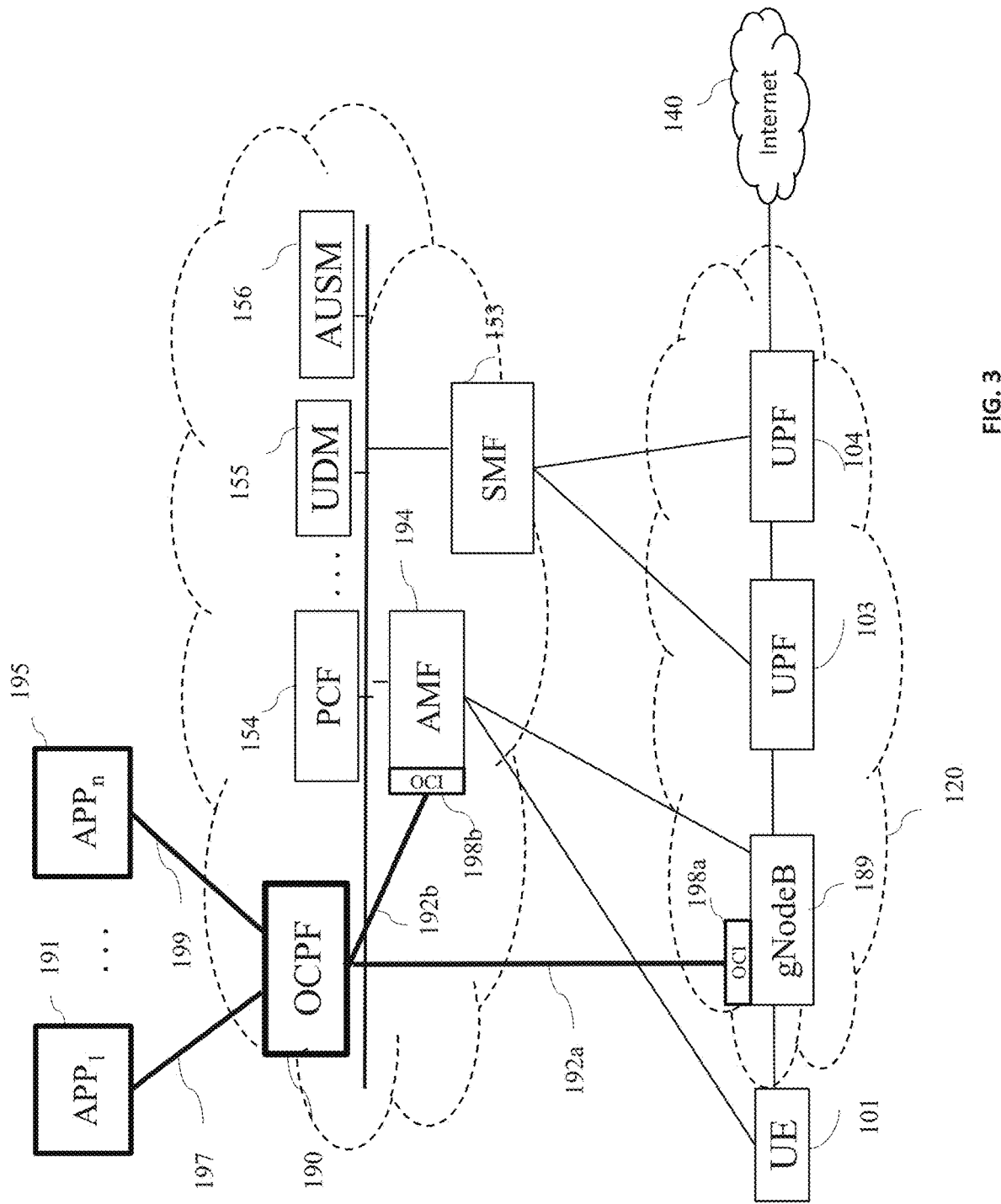
FIG. 3 illustrates an exemplary 5G control plane with OCPF according to invention.

FIG. 3 illustrates an embodiment of this invention for a simple 5G network that is illustrated in FIG. 2. According to this invention, control plane functions within gNodeB 189 is opened up to 3rd Party application(s) APP1 191, and control plane functions within AMF 194 is opened up to another application(s), APPn 195. Here, gNodeB 189 has an Open Control Interface (OCI) module 198a to allow OCPF 190 to register to selected control services of eNodeB 189 and to receive control messages through interface 192a. Similarly, AMF 194 has an Open Control Interface (OCI) module 198b to allow OCPF 190 to register to selected control services of AMF 194 and to receive control messages through interface 192b. Furthermore, gNodeB 189 and AMF 194 have been modified, according to aspects of this invention, to provide the required capabilities to interact with their collocated OCI for proper message process handling to enable openness. In an exemplary embodiment, interfaces 192a and 192b use an IP protocol such as HTTP. The payload carries (a) registration messages or (b) control messages.

OCPF 190 is implemented as a control plane function along with other control plane functions of prior art such as PCF 154, UDM 155, etc. Note that OCI 198a and OCI 198b register their respective CP functions with OCPF 190 during CP registration phase.

Although in the first embodiment we assumed that each control function initiates registration with the OCPF (CP registration phase), in another possible embodiment, the registration may follow a different sequence such as:

(a) each control function first registers with a function such as the Network Repository Function (NRF) of the control plane by declaring itself as an 'open' control function, (b) OCPF attaches and queries NRF for those open control functions, and (c) OCPF initiates the CP registration with each open control function.

The APP1 and APP2 register with OCPF 190 during application registration phase using interfaces 197 and 199, respectively. Interfaces 197 and 199 are used for application registration (first leg) as well as control message handling. Similarly, interfaces 192a and 192b are used for CP registration, application registration (second leg) as well as control message handling.

Within the context of this invention, the terms such as control message and signaling message are used interchangeably. Similarly, control application, signaling application, control service, signaling service or application are terms that are used interchangeably for an operator or 3rd Party application that consumes services of an open control network according to aspects of this invention.

The sequence of registration is simply for exemplary purposes to improve the understanding of the operations of OCPF. One may design the OCPF without requiring one or more steps of the registration phase, or by using different steps and procedures for registration.

Figure 4:
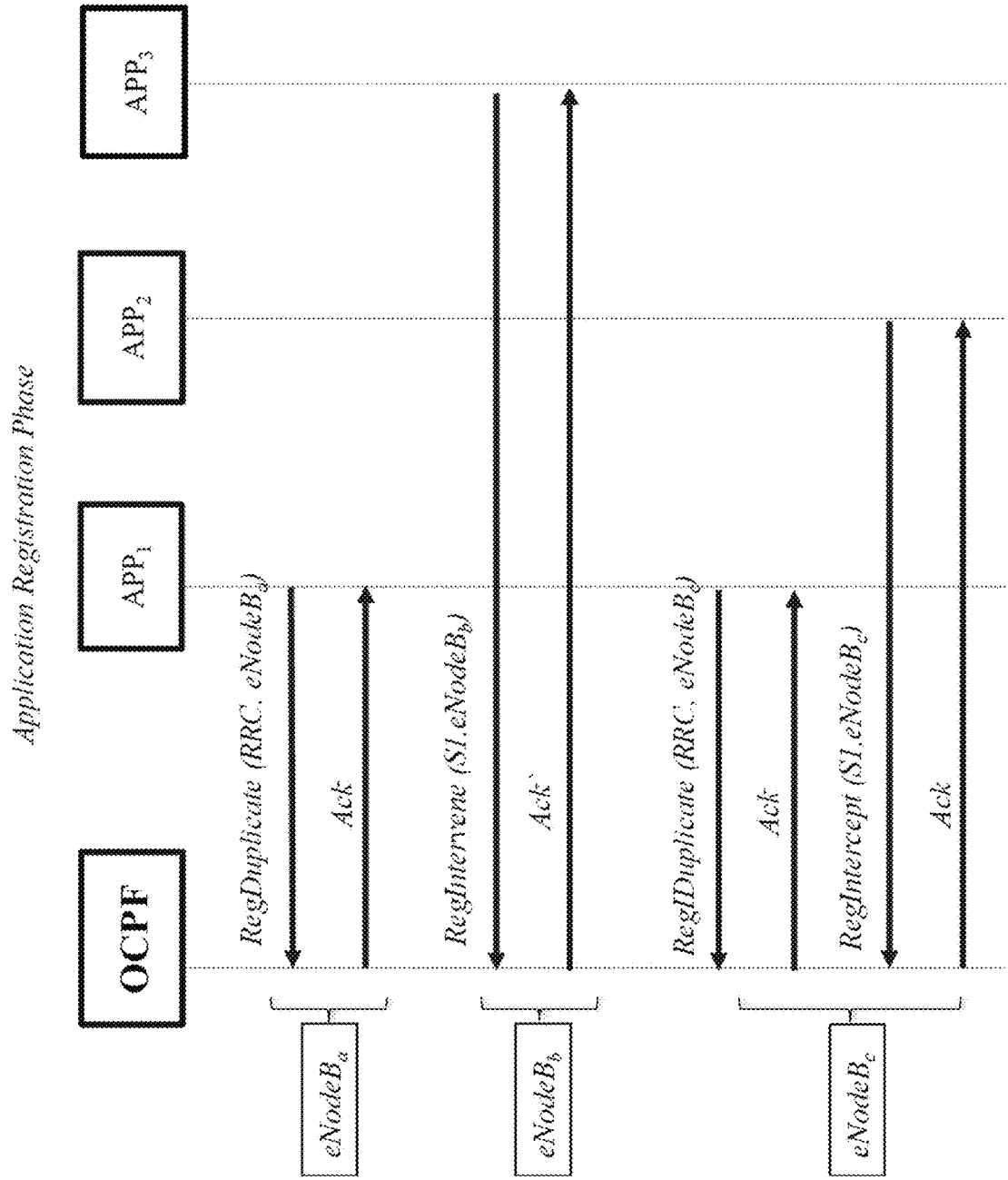
FIG. 4 illustrates an exemplary of services and their registrations to OCPF.

FIG. 4 illustrates (the first leg of) application registration phase of three applications with OCPF:

APP1 registers to
'duplicate' RRC of eNodeBa. using RegDuplicate exemplary message.
'duplicate' RRC of eNodeBc. using RegDuplicate exemplary message.
APP2 registers to 'intercept' S1 of eNodeBc using RegIntercept exemplary message.
APP3 registers to 'intervene' S1 of eNodeBb using RegIntervene exemplary message.

The registration messages may include several information elements such as the specific control interface type, specific control function id/name, the list of explicitly specified UEs, or a group of UEs that has the same attribute such as a network slice identifiable within the control message packet header such as NSSI (network slice subnet instance), the start and stop time of the requested service, etc.

Figure 5:
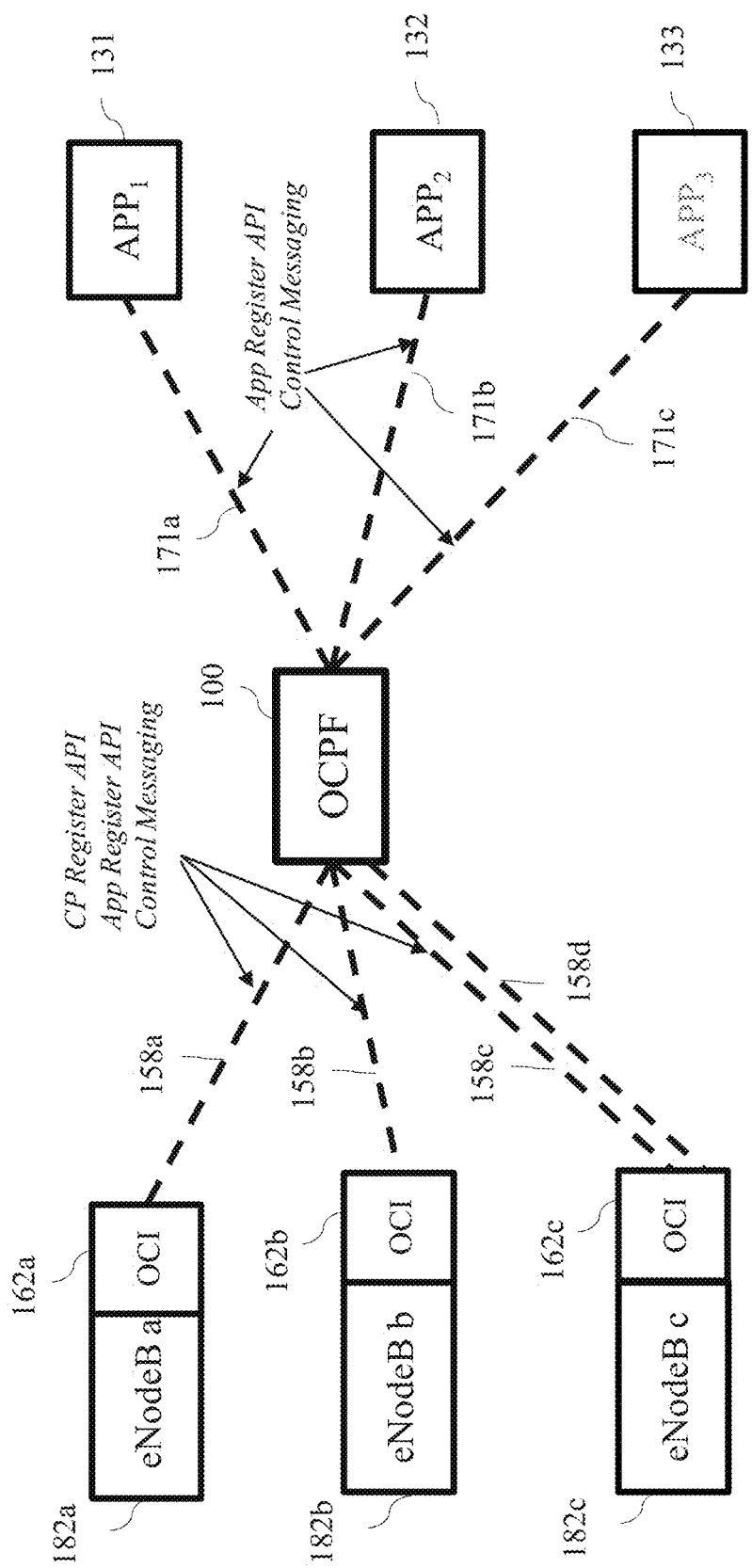
FIG. 5 illustrates the first and second interfaces of OCPF.

FIG. 5 illustrates the applications and control functions of FIG. 4 along with specific interfaces of OCPF. APP1 131 uses interface 171a, APP2 132 uses interface 171b, and APP3 133 uses interface 171c for application registration and control messaging. Similarly, eNodeBa 182a uses OCI 162a to connect to OCPF via interface 158a. eNodeBb 182b uses OCI 162b to connect to OCPF via interface 158b, and eNodeBc 182c uses OCI 162c to connect to OCPF via interface 158c. These interfaces are used for CP registration, (second leg of) application registration, and control messaging. Note that APP1 131 registers to the same service on two base stations (eNodeBa and eNodeBc). However, APP2 132 and APP3 133 both register to services of only one base station. Many service registration alternatives are possible:

Multiple applications may register to the same service (e.g. RRC) of one base station.
Multiple applications may register to the different services (e.g., RRC and S1) of one base station.
Multiple applications may register to the different services (e.g., RRC and S1) of different base stations (e.g., eNodeBa and eNodeBc).
Single application may register to different services (e.g., RRC and S1) of the same base station.
Single application may register to different services (e.g., RRC and S1) of different base stations (e.g., eNodeBa and eNodeBc).

Figure 6:
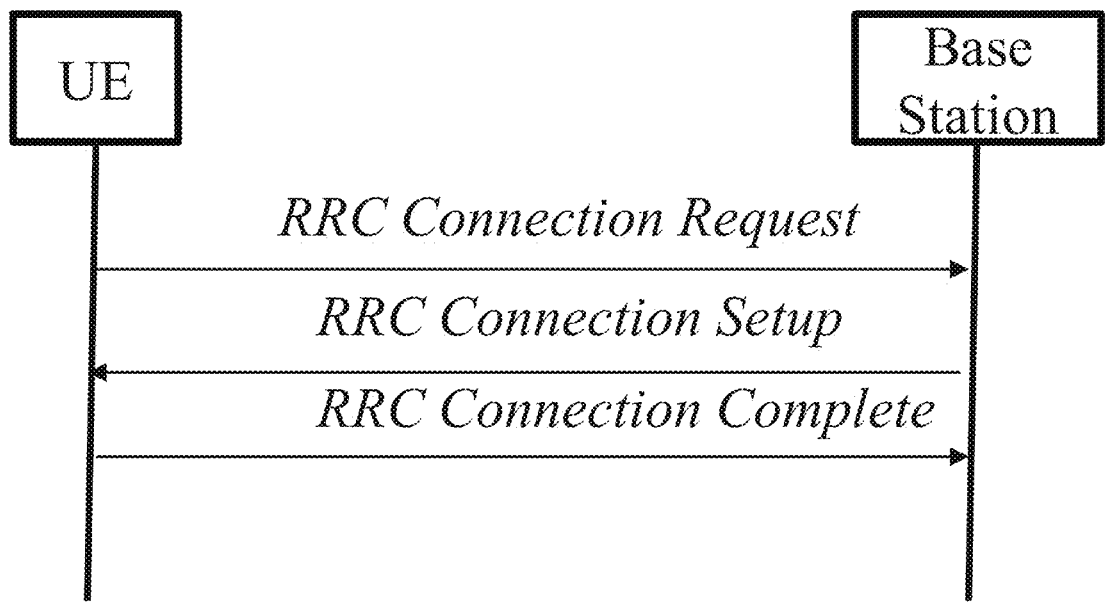
FIG. 6 illustrates the RRC procedure according to prior art.
Figure 6:
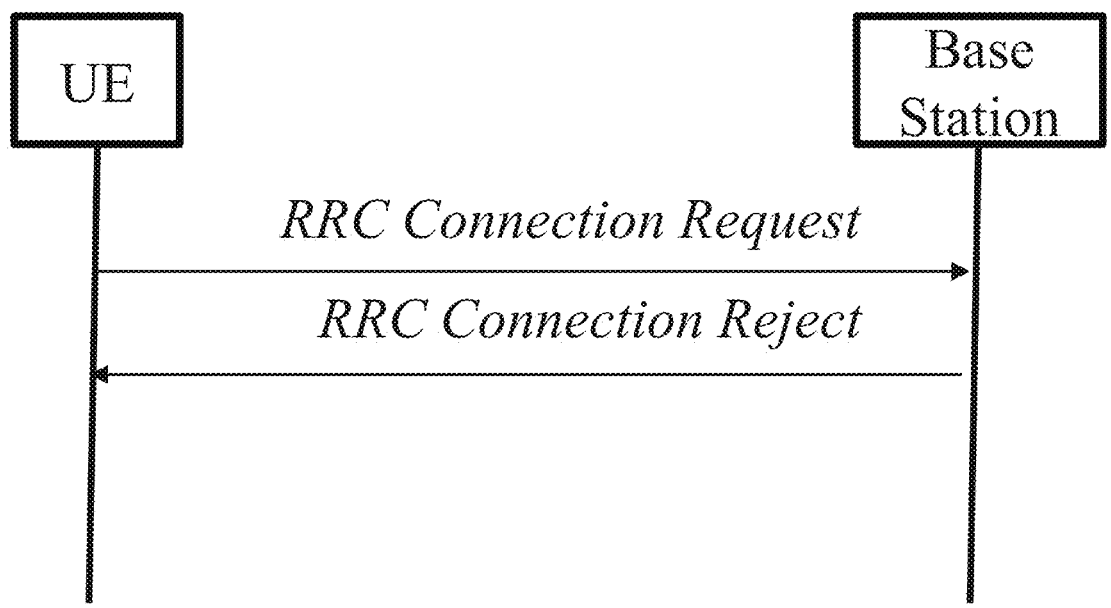

One of the most essential control/signaling protocol between a UE and base station is RRC, which is well known in prior art, and illustrated in FIG. 6. This protocol has the steps of establishing a new connection between a UE and base station. The figure illustrates the successful and unsuccessful connection setup scenarios. The UE starts with RRC Connection Request, upon receiving this message, base station sends RRC Connection Setup, and the procedure is completed by UE sending an RRC Connection Complete. The RRC Connection Setup message defines the connection properties between the UE and the base station. In prior art, RRC messages are always between the UE and base station, and on the radio interface, and therefore never sent to other interfaces. This invention allows the base station to be instructed to send such messages that are invisible to outside world to an application that wants to see a duplicate or to process it.

After the completion of application registration to a control function, its OCI must send a so called 'action registration' to the control function to indicate what control messages and how it wants to receive/send. These actions specify, for example, which messages (and under which trigger conditions) must be forwarded, received, discarded, suspended or resumed. When specific actions are successfully configured by the control function and an ACK is sent to the OCI, the OCI in turn sends the ACK to the OCPF during the second leg of application registration. There may be other types of control services that are not covered here, but this invention includes all other services that require an open control network function.

Figure 7:
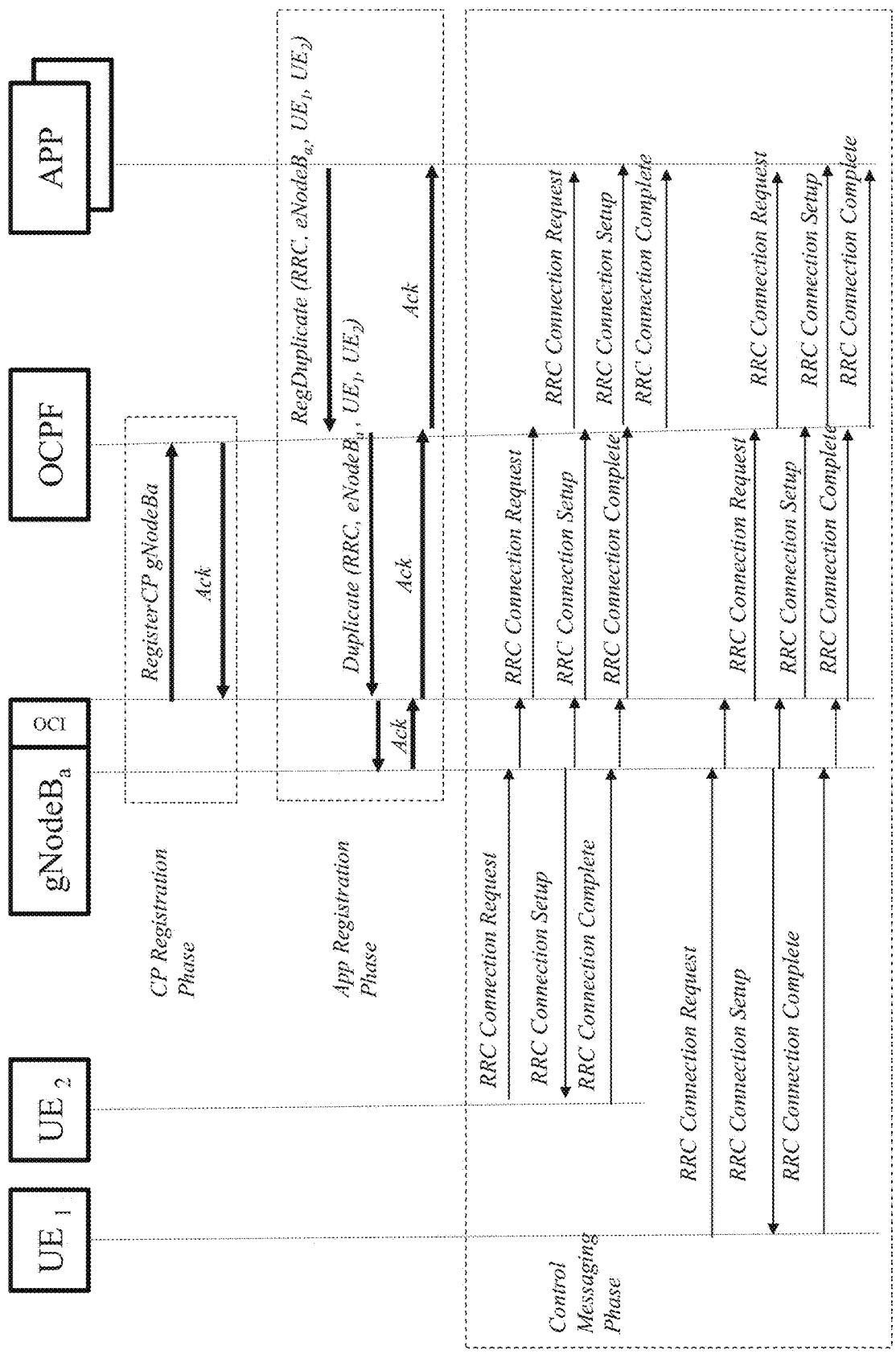
FIG. 7 illustrates the registration for 'duplicate service' and control messaging with OCPF.

In FIG. 7, a simple probe application that registers with the OCI of gNodeBa the 'duplicate RRC service' for RRC Connection Setup procedure, which aims at receiving copies of all RRC Connection Setup procedure related messages (RRC Connection Request, RRC Connection Setup, RRC Connection Complete, and RRC Connection Reject) between UE1 and gNodeBa, and UE2 and gNodeBa.

The OCI first registers its control function (gNodeBa) with OCPF during the CP Registration phase. Next, the application sends the RegDuplicate(*) message directly to OCPF. In turn, OCPF sends a Duplicate(*) message to the readily-registered gNodeBa's OCI. Note that the RegDuplicate(*) and Duplicate(*) messages may be the same or different depending on implementation. Then, OCI sends the required actions to gNodeBa and when gNodeBa returns an ACK, the OCI sends an ACK to OCPF, which forwards it to the application. The ACK signifies the successful completion of the application registration phase. After this phase, OCI starts forwarding the RRC messages that it receives from the gNodeBa towards OCPF, and OCPF starts forwarding them towards the application for UE1 and UE2.

Figure 8:
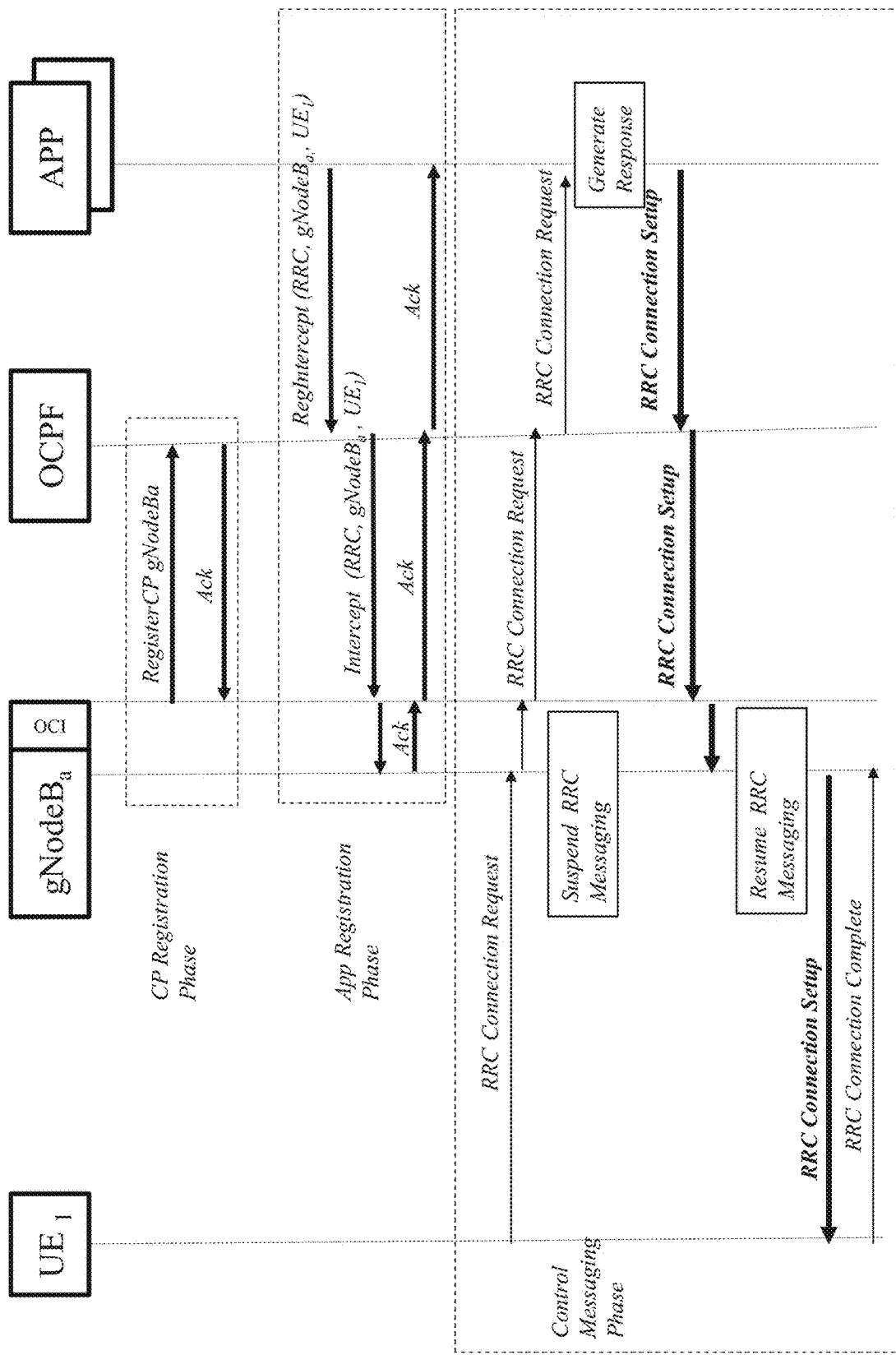
FIG. 8 illustrates the registration for 'intercept service' and control messaging with OCPF.

FIG. 8 shows a flow diagram of another type of 3rd Party application, which is a slice Admission control attached to the control plane. The control plane registration is the first step. The second step is the application registration. This application first registers to the 'Intercept RRC service', which basically aims at receiving a copy of RRC Connection Request that is sent by UE to base station. The aforementioned application first attaches to OCPF. The application sends the RegIntercept(*) message to OCPF. The registration contains information elements on which RRC messages are of interest. In turn, OCPF sends an Intercept(*) message to the OCI of gNodeBa. Once the OCI return an ACK to OCPF, signifying a successful completion of the registration phase, the OCPF sends an ACK to the application. Note that prior to this step, the OCI must send the required actions to gNodeB a.

After this phase, the base station, receiving the first RRC Connection Request Message matching the profile from the UE, forwards it to its OCI, and suspends the RRC process for that specific profile. OCI sends the message to OCPF, which in turn sends it to the application. The application generates the response in an RRC Connection Setup Message. The application returns the message to the OCPF. The message is forwarded by OCPF to OCI, and from OCI to base station. The base station resumes the RRC process by forwarding the received RRC Connection Setup to the UE. UE responds with an RRC Connection Complete Message. The following are the key actions of gNodeBa:

1. Send RRC Connection Request received from UE1 to OCI.
2. Suspend normal RRC messaging for UE1 until receiving the RRC Connection Setup from OCI.
3. Receive the RRC Connection Setup from OCI.
4. Resume normal messaging after receiving RRC Connection Setup from OCI.

Figure 9:
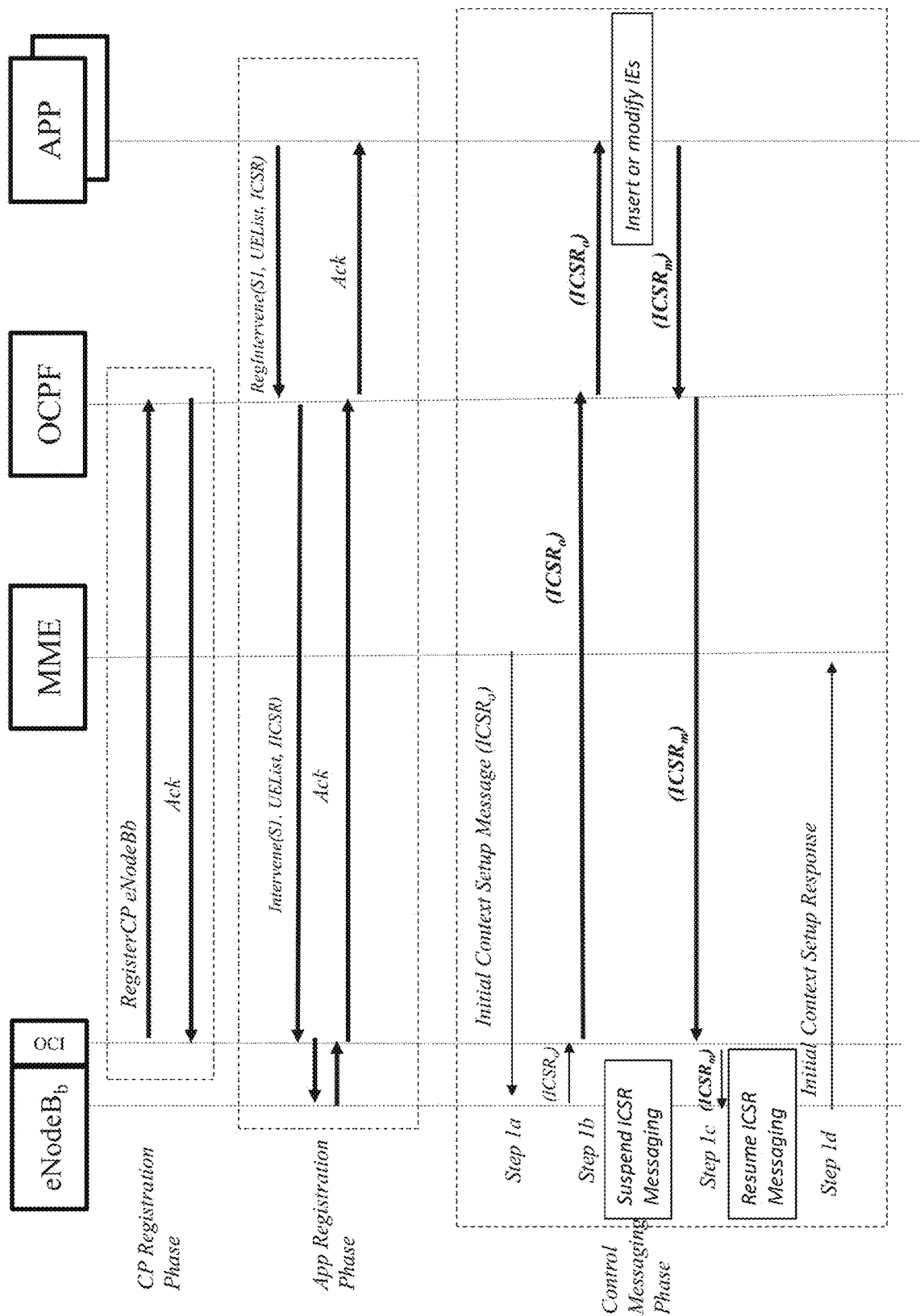
FIG. 9 illustrates the registration for 'intervene service' and control messaging with OCPF.

FIG. 9 shows a flow diagram of another type of exemplary 3rd Party application, which is a slice QoS control application attached to the control plane. The control plane registration is the first step. The second step is the application registration. This application first registers to 'Intervene S1 interface service', which basically aims at receiving a copy of Initial Context Setup Request (ICSR) that is sent by MME to base station on a specific S1-C interface. The aforementioned application first attaches to OCPF. The application sends the RegIntervene(*) message to OCPF. The registration contains information elements on which ICSRs are of interest. In turn, OCPF sends an Intervene(*) message to the OCI of eNodeBb. Once the OCI return an ACK to OCPF, signifying a successful completion of the registration phase, the OCPF sends an ACK to the application. Note that prior to this step, the OCI must send the required actions to eNodeBb.

After this phase, the eNodeBb, receiving the first Initial Context Setup Request, labeled as original ICSR (ICSRo) from the MME matching the profile in Step 1a, it forwards that ICSRo to its OCI in Step 1b, which in turn forwards it to OCPF and subsequently to the application. It is important to note that (a) either the OCI keeps the ICSRo in its database until the modified version arrives, or (b) both eNodeB and OCI simply discard the ICSRo since they are waiting for the application to intervene the message and send a (new) modified ICSRm in place of ICSRo. If the method of (a) is chosen, then OCI may need to keep the original messages in a pending state in a repository until the corresponding modified message has been received. The application may decide to change one or more IEs of ICSRo such as the QoS setting stored within the QCI IE of the ICSR message to reflect a specific slice related change. The application returns the modified ICSR, ICSRm back to the OCPF, and from OCPF to OCI and to base station in Step 1c. The OCI then discards the previously received ICSR (if it is stored in a pending state in the state machine of its Control Message Processor), replaces it with the updated ICSR and transfers that message back to eNodeB for normal processing. As a result, the eNodeB generates the Initial Context Setup Response in Step 1.d towards the MME to complete the procedure. Note that the eNodeB is instructed by OCI to perform the following actions in an order for the ICSR messages pertaining to say UE1:

5. Send ICSRo of UE1 to OCI, then discard (or store) message,
6. Wait to receive ICSRm from OCI corresponding to ICSRo of UE1,
7. Suspend normal messaging until receiving ICSRm,
8. Resume normal messaging after receiving ICSRm by generating the response message to UE.

Above state changes are dictated to the control function by OCI during the registration phase. A similar procedure can be defined on N2 interface between AMF and gNodeB and along other control interfaces.

Figure 10:
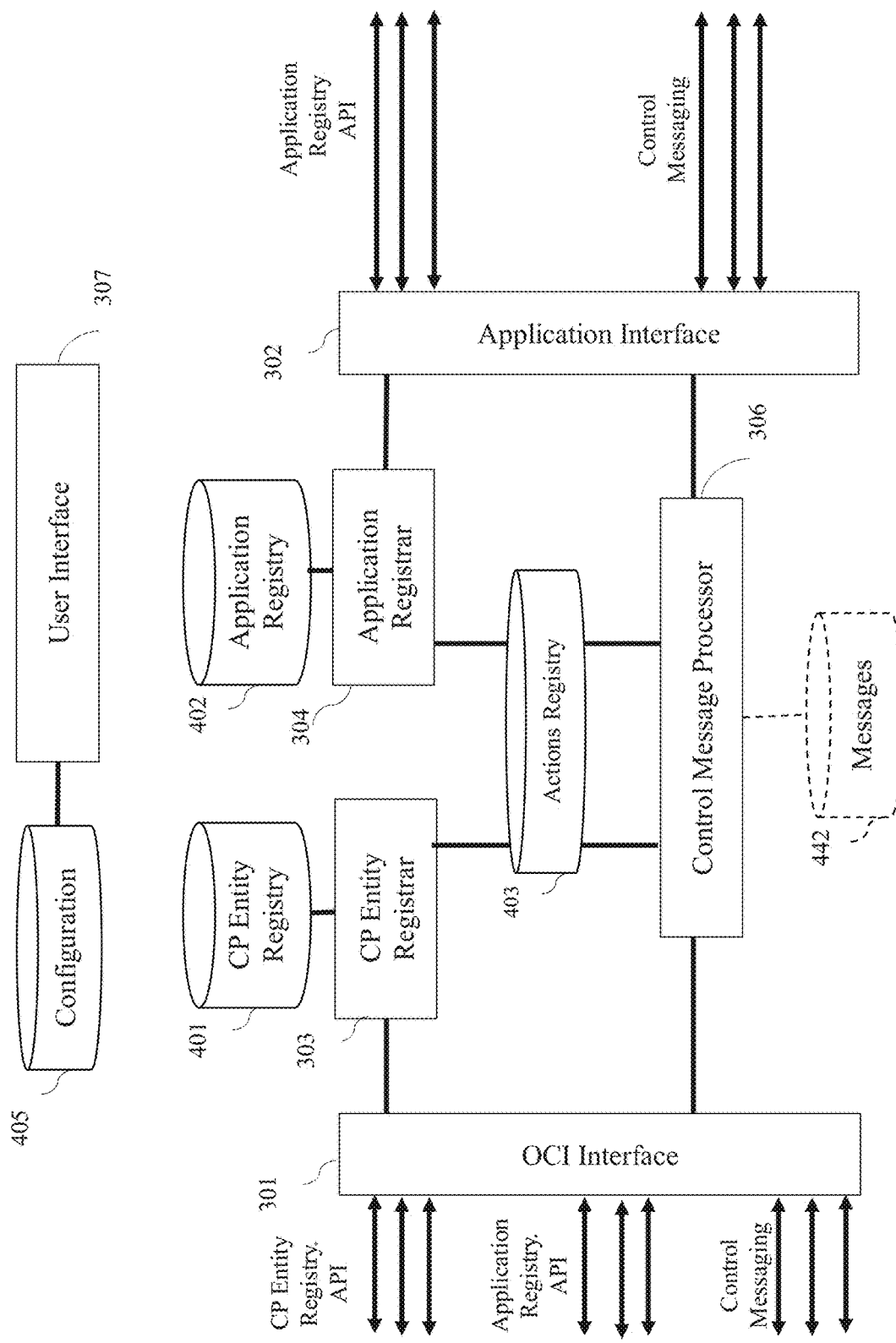
FIG. 10 illustrates a simple system diagram showing components of OCPF.

FIG. 10 shows a simple block diagram of OCPF showing its key components. The OCPF can be designed as a stand-alone control function, or as part of another control function of the 4G/5G control plane. It may physically reside on a stand-alone hardware platform such as a server, or share a physical platform with other network components.

OCPF has a plurality of interfaces to other control functions, and a plurality of interfaces to applications. The application interface 302 enables a plurality of different applications to securely connect and register to available open control services. This interface supports the application registration messaging as well as control messaging between the OCPF and each application. Information pertaining to applications that register with OCPF are stored in Application Registry 402. Application Registrar 304 authenticates and authorizes each application, and then registers the application-specific information into Application Registry 402.

OCPF has OCI interface 301, which enables a plurality of different control functions to securely connect and register to OCPF. This interface supports the registration messaging as well as control message forwarding between the OCPF and each control function's OCI. Those control function that register with OCPF are stored in CP Entity Registry 401. CP Entity Registrar 303 authenticates and authorizes each control function, and then registers the control function-specific information into CP Entity Registry 401. In another embodiment, the OCPF may initiate the registration with each control function provided that it can obtain information about the open control function from another network function such as the NRF.

Each application's requested control messaging actions are sent by OCPF to OCI, and also stored into Actions Registry 403, which controls Control Message Forwarder 306, which handles the sequencing of control messages from/to OCI and to/from application. Messages 442 is a database used to pair any related (sequenced) messages that are in the process. The Actions Registry 403 may include the following possible actions for a specific type of messaging protocol:

message forwarding to OCI
message receiving from OCI
message forwarding to application
message receiving from application
message discarding, after message forwarding
message discarding, after message receiving
suspending messaging until a specific trigger
resuming messaging at a specific trigger OCPF has a user interface 307 and configuration database 305 for the booth-up, initial configuration, and element management of OCPF.

In yet another embodiment, the present invention provides an article of manufacture comprising non-transitory computer storage medium storing computer readable program code which, when executed by a processor implements a method as implemented in an Open Control Plane Function (OCPF) of sending one or more signaling messages generated in a mobile network, the mobile network comprising a separate control plane and user plane, the control plane comprising at least one control function, the at least one control function generating the one or more signaling messages, the one or more signaling messages transmitted to an application, the application external to the control plane and operated by a mobile operator or a third-party service provider, the medium comprising: (a) computer readable program code receiving a first registration message from the at least one control function and, upon receipt of the first registration message, registering the one control function in the OCPF; (b) computer readable program code receiving a second registration message from the application and, upon receipt of the second registration message, registering the application in the OCPF, the registering allowing the application to receive the one or more signaling messages from the at least one control function, the one or more signaling messages pertaining to a group of users of the mobile network; (c) computer readable program code receiving the one or more signaling messages pertaining to the group of users from the at least one control function, the one or more signaling messages received at the at least one control function from the group of users prior to being relayed to the OCPF; and (e) computer readable program code relaying the one or more signaling messages to the application.

In another embodiment, the present invention provides an article of manufacture comprising non-transitory computer storage medium storing computer readable program code which, when executed by a processor implements a method as implemented in an Open Control Plane Function (OCPF) of sending one or more signaling messages generated in a mobile network, the mobile network comprising a separate control plane and user plane, the control plane comprising at least one control function, the at least one control function generating the one or more signaling messages, the one or more signaling messages transmitted to an application, the application external to the control plane and operated by a mobile operator or a third-party service provider, the medium comprising: (a) computer readable program code receiving a first registration message from the at least one control function and, upon receipt of the first registration message, registering the one control function in the OCPF; (b) computer readable program code receiving a second registration message from the application and, upon receipt of the second registration message, registering the application in the OCPF, the registering allowing the application to receive and/or modify the one or more signaling messages originating from the at least one control function, the one or more signaling messages pertaining to a group of users of the mobile network; (c) computer readable program code receiving from the control function a given signaling message and, upon receiving the given signaling message, suspending normal signaling message process for the group of users; (d) computer readable program code relaying the given signaling message to the application, wherein the application either generates a new signaling message or modifies the given signaling message to form a modified signaling message in response to the received given signaling message; (e) computer readable program code receiving the new signaling message or the modified signaling message from the application; (f) computer readable program code relaying the new signaling message or the modified signaling message to the control function; and wherein the control function receives the new signaling message or the modified signaling message and resumes normal signaling message process with the received new signaling message or the modified signaling message for the group of users.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM, a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

CONCLUSION

A system and method has been shown in the above embodiments for the effective implementation of an open control plane function for wireless networks. While various preferred embodiments have been shown and described, it will be understood that there is no intent to limit the invention by such disclosure, but rather, it is intended to cover all modifications falling within the spirit and scope of the invention, as defined in the appended claims.

The invention claimed is:

1. A method of sending one or more signaling messages generated in a mobile network, the mobile network comprising a separate control plane and user plane, the control plane comprising at least one control function, the at least one control function generating the one or more signaling messages, the one or more signaling messages transmitted to an application, the application external to the control plane and operated by a mobile operator or a third-party service provider, the method, as implemented in an Open Control Plane Function (OCPF) comprising the steps of:
(a) receiving a first registration message from the at least one control function and, upon receipt of the first registration message, registering the one control function in the OCPF;
(b) receiving a second registration message from the application and, upon receipt of the second registration message, registering the application in the OCPF, the registering allowing the application to receive the one or more signaling messages from the at least one control function, the one or more signaling messages pertaining to a group of users of the mobile network;
(c) receiving the one or more signaling messages pertaining to the group of users from the at least one control function, the one or more signaling messages received at the at least one control function from the group of users prior to being relayed to the OCPF; and
(d) relaying the one or more signaling messages to the application.

2. The method of claim 1, wherein the control function belongs to control plane layer and functions of any of the following: a base station, mobile management entity (MME), access and mobility management function (AMF) and session management function (SMF).

3. The method of claim 1, wherein the first or second registration message at least includes an indication of a specific protocol type.

4. The method of claim 1, wherein the first or second registration message at least includes an indication of a specific procedure or message sequence.

5. The method of claim 4, wherein the specific procedure or message sequence relates to any of the following: an initial context setup or handover.

6. The method of claim 1, wherein the second registration message at least includes an identifier of the requesting application.

7. A method of sending one or more signaling messages generated in a mobile network, the mobile network comprising a separate control plane and user plane, the control plane comprising at least one control function, the at least one control function generating the one or more signaling messages, the one or more signaling messages transmitted to an application, the application external to the control plane and operated by a mobile operator or a third-party service provider, the method, as implemented in an Open Control Plane Function (OCPF) comprising the steps of:
(a) receiving a first registration message from the at least one control function and, upon receipt of the first registration message, registering the one control function in the OCPF;
(b) receiving a second registration message from the application and, upon receipt of the second registration message, registering the application in the OCPF, the registering allowing the application to receive and/or modify the one or more signaling messages originating from the at least one control function, the one or more signaling messages pertaining to a group of users of the mobile network;
(c) receiving from the control function a given signaling message and, upon receiving the given signaling message, control function suspending normal signaling message process for the group of users;
(d) relaying the given signaling message to the application, wherein the application either generates a new signaling message or modifies the given signaling message to form a modified signaling message in response to the received given signaling message;
(e) receiving the new signaling message or the modified signaling message from the application;
(f) relaying the new signaling message or the modified signaling message to the control function;
wherein the control function receives the new signaling message or the modified signaling message and resumes normal signaling message process with the received new signaling message or the modified signaling message for the group of users.

8. The method of claim 3, wherein the modified signaling message has at least one information element that is different than that of the given signaling message.

9. The method of claim 7, wherein the control function belongs to control plane layer and functions of any of the following: a base station, mobile management entity (MME), access and mobility management function (AMF) and session management function (SMF).

10. The method of claim 7, wherein the first or second registration message at least includes an indication of a specific protocol type.

11. The method of claim 7, wherein the first or second registration message at least includes an indication of a specific procedure or message sequence.

12. The method of claim 11, wherein the specific procedure or message sequence relates to any of the following: an initial context setup or handover.

13. The method of claim 7, wherein the second registration message at least includes an identifier of a requesting application.

14. A control function of the control plane of the mobile operator, the control function comprising:
 (a) a first registration interface to register a plurality of external applications;
 (b) a first database storing information on the plurality of external applications;
 (c) a second registration interface to register a plurality of control functions;
 (d) a second database storing information on the plurality of control functions;
 (e) a subfunction receiving a service request of the external application for handling certain signaling messages of each of the plurality of control functions;
 (f) a third database storing the service request of each the external application for each message type;
 (g) a first control messaging interface to communicate with the plurality of external applications;
 (h) a second control messaging interface to communicate with the plurality of control functions; and
 (i) a control message processor to manage the state of each signaling message that is in the processing by said external application.

15. The control function of claim 14, wherein the first and second control messaging interfaces and the first and second registration interfaces are a single interface.

16. The control function of claim 13, wherein the first and second control messaging interfaces and the first and second registration interfaces are different interfaces.

17. An article of manufacture comprising non-transitory computer storage medium storing computer readable program code which, when executed by a processor implements a method as implemented in an Open Control Plane Function (OCPF) of sending one or more signaling messages generated in a mobile network, the mobile network comprising a separate control plane and user plane, the control plane comprising at least one control function, the at least one control function generating the one or more signaling messages, the one or more signaling messages transmitted to an application, the application external to the control plane and operated by a mobile operator or a third-party service provider, the medium comprising:
 (a) computer readable program code receiving a first registration message from the at least one control function and, upon receipt of the first registration message, registering the one control function in the OCPF;
 (b) computer readable program code receiving a second registration message from the application and, upon receipt of the second registration message, registering the application in the OCPF, the registering allowing the application to receive the one or more signaling messages from the at least one control function, the one or more signaling messages pertaining to a group of users of the mobile network;
 (c) computer readable program code receiving the one or more signaling messages pertaining to the group of users from the at least one control function, the one or more signaling messages received at the at least one control function from the group of users prior to being relayed to the OCPF; and
 (d) computer readable program code relaying the one or more signaling messages to the application.

18. The article of manufacture of claim 17, wherein the control function belongs to control plane layers and functions of any of the following: a base station, mobile management entity (MME), access and mobility management function (AMF) and session management function (SMF).

19. The article of manufacture of claim 17, wherein the first or second registration message at least includes an indication of a specific protocol type.

20. The article of manufacture of claim 17, wherein the first or second registration message at least includes an indication of a specific procedure or message sequence.

21. The article of manufacture of claim 20, wherein the specific procedure or message sequence relates to any of the following: an initial context setup or handover.

22. The article of manufacture of claim 17, wherein the second registration message at least includes an identifier of a requesting application.

\* \* \* \* \*